United States Patent
Gollier et al.

(10) Patent No.: US 9,411,180 B2
(45) Date of Patent: Aug. 9, 2016

(54) APPARATUS AND METHOD FOR DETERMINING SPARKLE

(75) Inventors: Jacques Gollier, Painted Post, NY (US); Shandon Dee Hart, Corning, NY (US); Garrett Andrew Piech, Corning, NY (US); James Andrew West, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 1179 days.

(21) Appl. No.: 13/354,827

(22) Filed: Jan. 20, 2012

(65) Prior Publication Data

US 2012/0221264 A1 Aug. 30, 2012

Related U.S. Application Data

(60) Provisional application No. 61/447,285, filed on Feb. 28, 2011.

(51) Int. Cl.
| | |
|---|---|
| *G01R 31/26* | (2014.01) |
| *G02F 1/13* | (2006.01) |
| *G01J 1/18* | (2006.01) |
| *G02F 1/1335* | (2006.01) |
| *G01J 1/42* | (2006.01) |

(52) U.S. Cl.
CPC .............. *G02F 1/1309* (2013.01); *G01J 1/18* (2013.01); *G01J 1/4228* (2013.01); *G02F 1/133502* (2013.01); *G01J 2001/4247* (2013.01)

(58) Field of Classification Search
CPC ..... G01J 1/18; G01J 1/4228; G02F 1/133502; G02F 1/1309; G02F 1/1303; G09G 3/006; G09G 2360/147; C03C 2204/08; G01N 2021/9513; G01N 21/958; G02B 5/0294

USPC ........ 65/29.12; 324/760.01, 760.02; 345/207; 348/180; 702/81

See application file for complete search history.

(56) References Cited

U.S. PATENT DOCUMENTS

| | | | | |
|---|---|---|---|---|
| 5,793,221 A | * | 8/1998 | Aoki ..................... | G02F 1/1309 324/760.01 |
| 5,826,122 A | * | 10/1998 | Shekel ................. | G03B 15/003 348/552 |
| 6,466,368 B1 | * | 10/2002 | Piepel .................. | G03B 21/625 359/452 |
| 6,697,515 B2 | | 2/2004 | Furui | |
| 2010/0246016 A1 | * | 9/2010 | Carlson ................. | G03C 15/00 359/599 |

FOREIGN PATENT DOCUMENTS

| | | |
|---|---|---|
| JP | 04484177 | 1/2000 |
| KR | 872621 | 2/2000 |

* cited by examiner

*Primary Examiner* — Daniel Miller
(74) *Attorney, Agent, or Firm* — Timothy M. Schaeberle (57) ABSTRACT

An apparatus and method for determining and quantifying "sparkle"—the random noise that is generated when a pixelated image is viewed through a roughened surface of a transparent sample. The apparatus includes a pixelated source and an imaging system located in an optical path originating from the pixelated source, wherein a transparent sample may be placed in the optical path between the pixelated source and the optical system. The degree of sparkle is determined by obtaining an integrated image for the pixelated image; and calculating a standard deviation of the integrated pixel power. An objective level of sparkle can be defined by correlating the amount of sparkle provided by the apparatus with visual impressions.

24 Claims, 6 Drawing Sheets

FIG. 1

FIG. 3
(new)

APPARATUS AND METHOD FOR DETERMINING SPARKLE

CROSS-REFERENCE TO RELATED APPLICATIONS

This application claims the benefit of priority under 35 U.S.C. §119 of U.S. Provisional Application Ser. No. 61/447285 filed on Feb. 28, 2011 the content of which is relied upon and incorporated herein by reference in its entirety.

BACKGROUND

Antiglare surfaces are frequently used in pixelated display applications, such as in liquid crystal displays (LCDs), to avoid specular reflections of ambient light from the display. Such antiglare surfaces are typically formed by introducing some degree of roughness on the surface of the display in order to spread the light reflected by that surface over a certain angle. If the antiglare surface is too rough, random noise—referred to as "sparkle"—is introduced into the image.

SUMMARY

An apparatus and method for determining and quantifying "sparkle"—the random noise that is generated when a pixelated image is viewed through a roughened surface of a transparent sample—are provided. By correlating the amount of sparkle provided by the apparatus with visual impressions, an objective level of sparkle can be defined.

Accordingly, one aspect of the disclosure is to provide an apparatus for measuring pixel power deviation (PPD). The apparatus comprises: a pixelated source comprising a plurality of pixels, wherein each of the plurality of pixels has referenced indices i and j; and an imaging system optically disposed along an optical path originating from the pixelated source. The imaging system comprises: an imaging device disposed along the optical path; and an aperture disposed on the optical path between the pixleated source and the imaging device, wherein the aperture has an adjustable collection angle for an image originating in the pixelated source.

A second aspect of the disclosure is to provide a method of determining pixel power deviation for a transparent sample. The method comprises: acquiring an image of the transparent sample combined with a pixelated source, the image comprising a plurality of source pixels; determining boundaries between adjacent source pixels in the image; integrating within the boundaries to obtain an integrated total power for each of the plurality of source pixels in the image; and calculating a dispersion of the integrated total power per pixel, wherein the dispersion is the pixel power deviation.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," "an," and the corresponding definite article "the" mean "at least one" or "one or more," unless otherwise specified.

Figure 1:
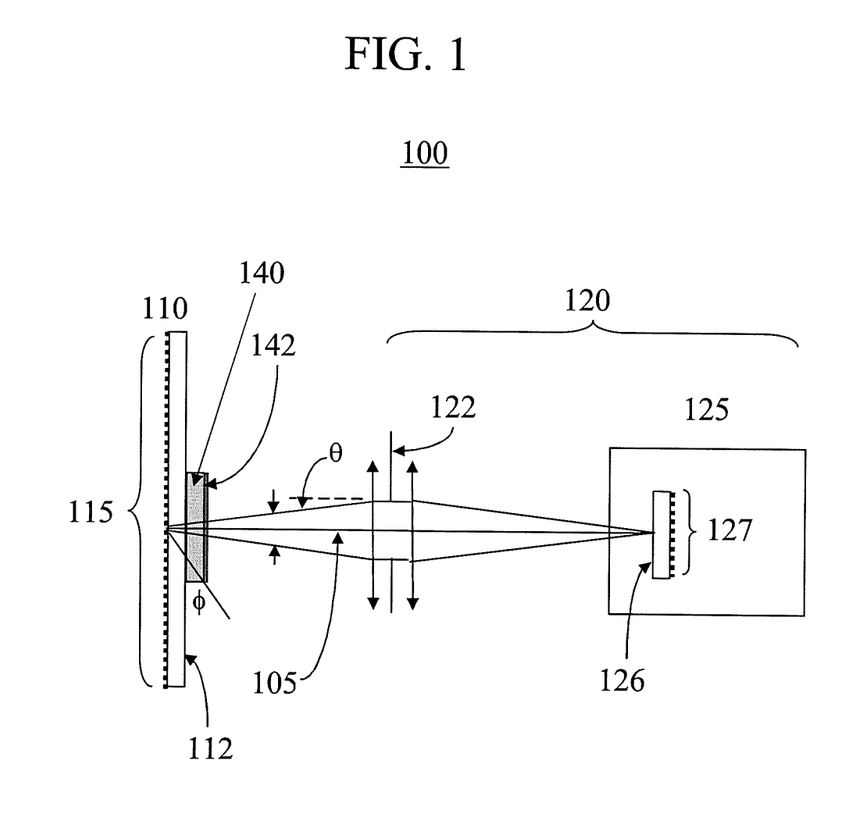
FIG. 1 is a schematic representation of an apparatus for determining sparkle.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "sparkle," "pixel power deviation," and "PPD" are used interchangeably and refer as the standard deviation of total power per pixel in a pixelated display divided by the mean power per pixel in said display. Currently, the degree of sparkle of a sample is typically judged by visual inspection and there is no quantitative standard method for measuring "sparkle."

Display "sparkle" or "dazzle" is a generally undesirable side effect that can occur when introducing antiglare or light scattering surfaces into a flat panel display (FPD) system such as, for example, a liquid crystal display (LCD), an organic light emitting diode (OLED), touch screens, or the like. Sparkle is associated with a very fine grainy appearance of the display that can appear to have a shift in the pattern of the grains with changing viewing angle. This type of sparkle is observed when combining pixelated displays such as that of a LCD with antiglare surfaces and differs in type and origin from the type of "sparkle" or "speckle" that has been observed and characterized in projection or laser systems. The physical origins of this type of sparkle have not been previously well understood, and there has been substantial confusion in the related art between the different types of sparkle or speckle that can be visually observed in projection, laser, or pixelated flat-panel displays. In part due to the lack of basic understanding of the root cause of pixelated FPD sparkle, there have not previously existed any quantitative methods for measuring FPD sparkle that have been shown to correlate well to visual human observations.

An apparatus for determining "sparkle" or pixel power deviation (PPD) is provided and schematically shown in FIG. 1. Apparatus 100 includes a pixelated source 110 and an image display system 120 disposed along an optical path 105 originating from pixelated display. In some embodiments, optical path 105 is substantially perpendicular to the plane 112 of pixelated source 110; i.e., within about 10° of normal to the plane 112. In other embodiments (not shown), optical path 105 forms an angle φ of less than 90° with pixelated source 110. Pixelated source 110 includes a plurality of pixels (source pixels) 115 that form an image (not shown). Each of the plurality of pixels 115 has referenced indices i and j. In some embodiments, pixelated source 110 is a liquid crystal display (LCD) or an organic light emitting diode (OLED) display. In some aspects, the LCD pixelated source 110 does not have an antiglare surface.

Apparatus 100 further includes a means for locating a transparent sample 140 in optical path 105 between the pixelated source 110 and an aperture 122 of the image display system 120. Transparent sample 140 may, in some embodiments, comprise a glass such as, but not limited to, an alkali aluminosilicate glass and an alkali aluminoborosilicate glass. In some embodiments, transparent sample 140 has an antiglare or diffusing surface 142 that is opposite the surface of transparent sample 140 that faces the pixelated source 110. Antiglare surface 142 may be a plastic film applied to the sample 140. Alternatively, antiglare surface 142 is integral to and formed directly on the surface of sample 140. In these instances, the antiglare surface 142 may be formed by roughening a surface of the transparent sample 140. In some embodiments, the antiglare surface 142 is formed by chemically etching a surface of the transparent sample. In some embodiments, apparatus 100 includes transparent sample 140.

In other embodiments, the pixelated source 110 is a digital light processing (DLP) projector or a liquid crystal on silicon (LCOS) projector) that illuminates a diffusing surface. By placing the DLP or LCOS projector close to the antiglare or diffusing surface 142 of the sample 140, the size of the image pixels can be made very small. Several pixel geometries can be generated by providing a pixel size of, for example, 20 μm. In another non-limiting example, rectangular pixels of 60 μm×180 μm located on a 180 μm pitch may be generated by having a group of 3 pixels in the "ON" mode followed by a group of 6 pixels in the "OFF" mode. More complex geometries, such as hexagonal pixels or the like, may also be generated by creating groups of sub-pixels.

Image system 120 receives an image originating from pixelated source 110 (and passing through transparent sample 140, if present) and comprises an imaging device 125 and an aperture 122. Imaging device 125 receives and stores an image originating from pixelated source 110. In the embodiment shown in FIG. 1, imaging device 125 is disposed along optical path 105 and in direct view of pixelated source 110. In other embodiments (not shown), however, imaging device 125 may be disposed along a second optical path that is coupled to optical path 105 by means such as lensing and the like that are known in the art. In some embodiments, image system 120 is movable with respect to pixelated source 100 and, in particular embodiments, is rotatable about the pixelated source 100. Such movability of image system 120 enables measurement of how sparkle shape changes as a function of the viewing angle of vision or an observer. In some embodiments, imaging device 125 includes a camera that uses photographic film. Here, a photograph of the image is taken and subjected to post-processing techniques known in the art. In some embodiments, imaging device 125 has a pixelated sensitive area comprising a second plurality of pixels 127, wherein each of the second plurality of pixels is referenced with indices m and n. In one embodiment, imaging device 125 includes a CCD (charge-coupled device) camera. Imaging device 125 has a high pixel density relative to light source 110, such that when images of pixelated source 110 are captured by imaging device 125, there are many (e.g. >10) imaging device pixels (i.e., pixels in imaging device 125) per pixelated source pixel (i.e., pixels in pixelated source 110). Lenses may be optionally used to modify the image magnification and thus achieve or improve the ratio of imaging device pixels to pixelated source pixels.

Aperture 122 is disposed on the optical path 105 between the pixleated source 110 and the imaging device 125 to adjust the collection angle (θ in FIG. 1) of the image originating from the pixelated source 110. The amplitude and shape of sparkle is a function of the parameters of the eye of a human observer, such as the aperture of the human pupil, the resolution of the eye, and the distance of observer from the pixelated source 110. As such, the parameters of imaging system 120 are adjusted to be representative of those of a human eye. For example, to simulate a human eye having a 6 mm pupil diameter and located 0.5 m (500 mm) from pixelated source 110, aperture 122 is adjusted to provide a collection angle θ of about 12 mrad (milliradians), wherein collection angle θ is the full angle.

Figure 2:
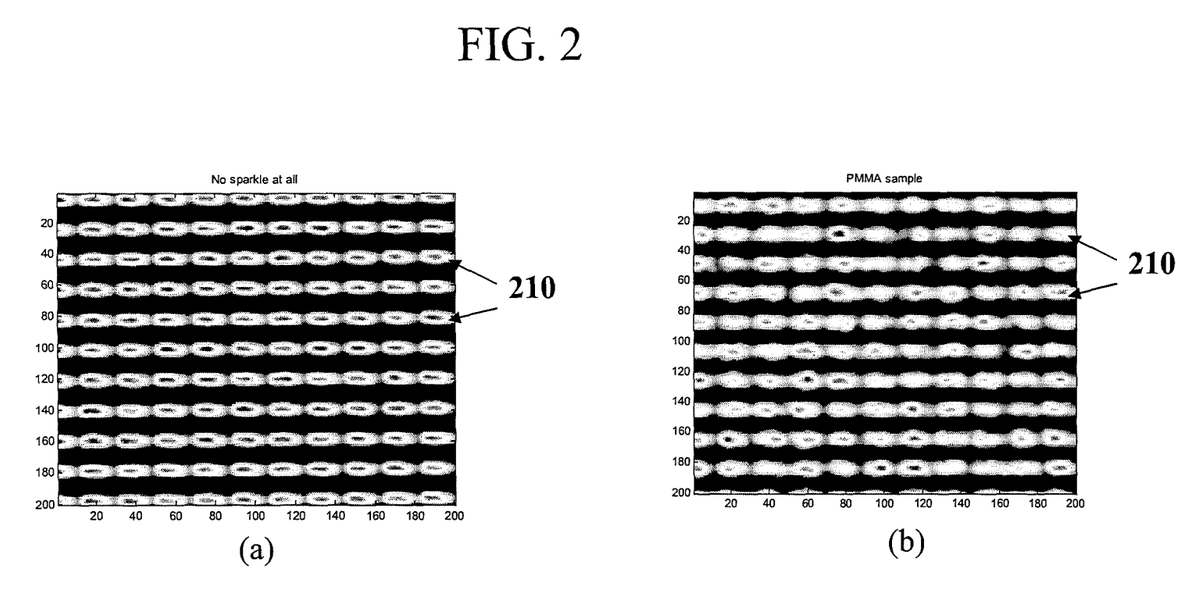
FIG. 2a is a first image acquired with the apparatus shown in FIG. 1 of a pixelated display combined with a transparent glass sheet.
FIG. 2b is a second image acquired with the apparatus shown in FIG. 1 of a pixelated display combined with a transparent glass sheet.

FIGS. 2a and 2b are false-color images acquired with the apparatus described herein of samples comprising a pixelated display combined with a transparent glass sheet. The sample shown in FIG. 2a does not exhibit any visible sparkle, and has pixel images 210 that are regular and consistent with each other. In contrast, the image shown in FIG. 2b exhibits visible distortion of the display pixels 210 and some dispersion on the power per pixel. Consequently, the pixels 210 shown in FIG. 2b are more diffuse and appear to merge together.

The noise per pixel and sparkle/PPD can be determined for a transparent sample based on images (such as those shown in FIGS. 2a and 2b) obtained with the apparatus 100 described herein. Accordingly, a method for determining sparkle/PPD of a transparent sample is provided. In a first step, an image of the transparent sample 142 combined with the pixelated source 110 is acquired by placing the transparent sample 140 in the optical path 105 between the pixelated source 110 and optical system 120. In some embodiments, the image is a pixelated image. The image comprises a plurality of source pixels 115. Referring to FIG. 1, the transparent sample 140 is placed in the optical path 105 between the pixelated source 110 and the imaging system 120. In some embodiments, the transparent sample 140 is placed at a predetermined distance from the pixelated source 110. In other embodiments, the transparent sample 140 is adjacent to and in contact with the pixelated source 110. In those instances where the transparent sample has an antiglare or diffuse surface 142, the transparent sample 140 is oriented such that the antiglare surface 142 is opposite the surface of transparent sample 140 that faces the pixelated source 110. Imaging device 125 receives—and, in some embodiments, stores—an image originating from pixelated source 110 and passing through transparent glass sheet 140.

Boundaries between adjacent source pixels 115 in the image are then determined. Pixelated source 110 comprises a plurality of pixels (source pixels) 115 having referenced indices i and j. Imaging device 125, n some embodiments, has a second plurality of pixels 127, wherein each of the second plurality of pixels 127 is referenced with indices m and n. The pitch (Δn,Δm) of each pixel in the second plurality of pixels 127 in the imaging device 125 is determined and a center position (n,m) is determined for each pixel in the pixelated image in the imaging device 125. As previously described herein above, the number of pixels in imaging device 125 is greater than the number of pixels in pixelated source. Thus, N pixels (n,m) in the imaging device 125 correspond to the center of each pixel (i, j) in the pixelated source 110. Pixel power is then integrated over a window centered on the center position (n,m) and having a size Δn×Δm) to obtain an integrated power per source pixel P(i,j). The standard deviation of the distribution P(i,j), normalized by the average of the distribution P(i,j), which is the amount of sparkle, or pixel power deviation (PPD) is then calculated.

There are multiple ways to determine the pixel pitch (Δn, Δm) described hereinabove. In one embodiment, a Fourier transform of the image is calculated. Due to the periodic nature of the pixilated image, the Fourier transform presents a series of peaks that correspond to the pixel frequency in vertical and horizontal directions as well as their harmonics. The pixel pitch can then be calculated as the inverse of the pixel frequency.

Also, there are multiple ways to determine the coordinate (n,m) of the center of each pixel. In one embodiment, a vector v, corresponding to a single horizontal line i of the image, is considered. All local minima along vector v are determined and are considered as the boundary between two adjacent pixels. The coordinate m is then calculated as the middle point between those boundaries. The same operation is repeated along image columns instead of along image lines i to obtain the coordinate n. Also, to minimize the impact of image noise to determine local minima, the vector v may be calculated as an average over multiple lines instead of being only one single line of the image.

In some embodiments, devise the entire image may be divided into sub-images. The algorithm is then applied over these sub-images instead over the entire image. For example, the image may sometimes present some intensity gradients which may to contribute to the standard deviation that leads to the PPD value. By applying the algorithm over sub-images, this effect can be minimized.

Figure 3:
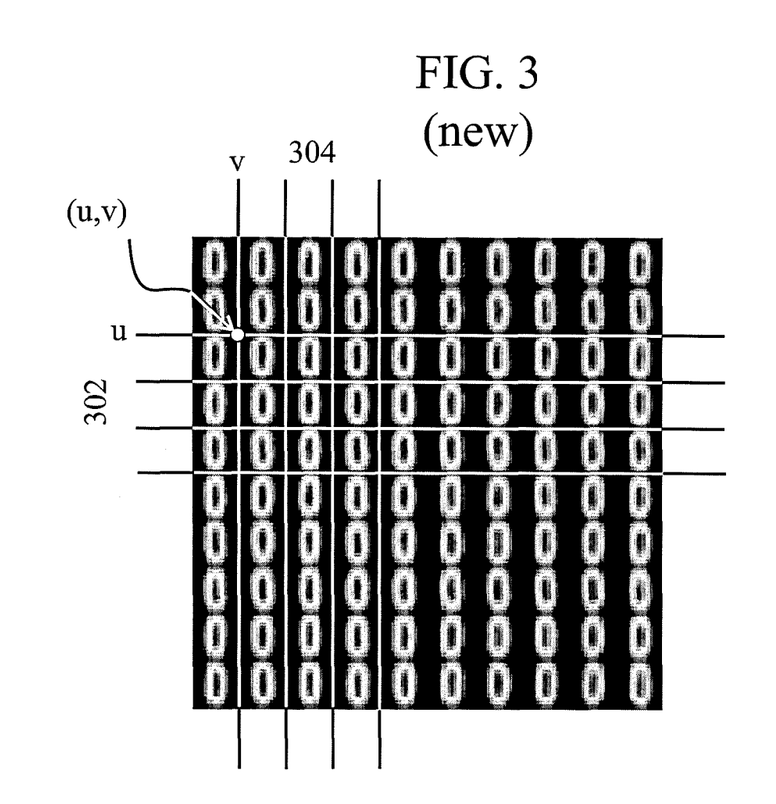
FIG. 3 is sub-image containing 10×10 LCD pixels of a pixelated display.
Figure 4:
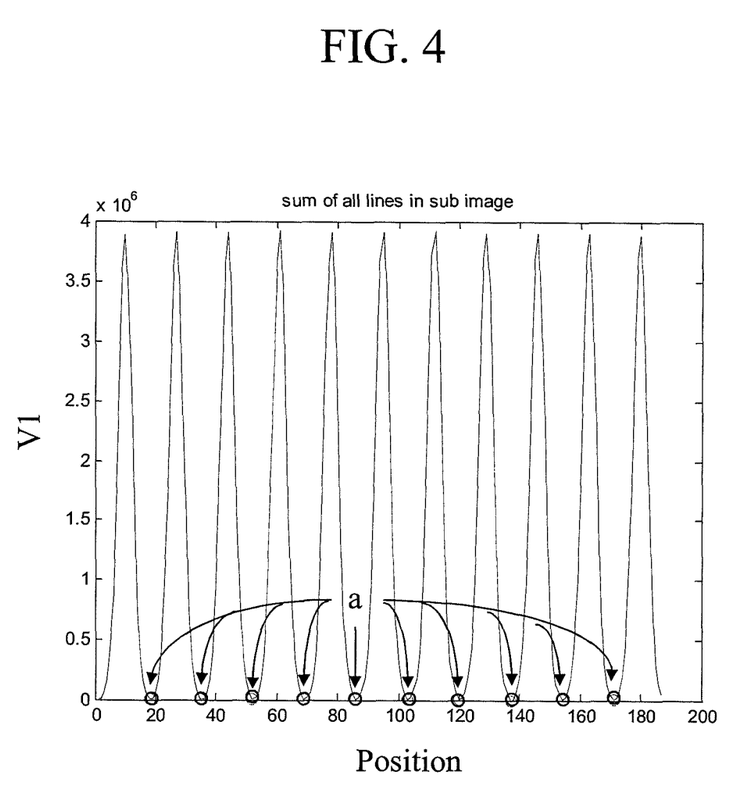
FIG. 4 is a plot of V1 values as a function of position in a pixelated image.

In one embodiment, the image processing algorithm that is used to calculate sparkle/PPD is as follows. An image (IM0) in which transparent sample 140 may be disposed in optical path 105 such shown, for example, in FIG. 1, and the pixel pitch (Δi,Δj) is determined. A Fourier transform of the image is then calculated. The peaks associated with the pixel pitch (Δi,Δj) are identified, and the pitch in both i and j directions is determined. The image is then divided into sub-images (SUBIM(k,1)) containing a predetermined or set number of pixels (source pixels) in pixelated source 110. For example, the sub-image may contain 10×10 LCD pixels, as shown in FIG. 3. Horizontal boundaries 302 and vertical boundaries 304 for a portion of the source pixels in the sub-image are also shown in FIG. 3. Vector V1, which is equal to the sum of all lines into sub-image (SUBIM(k,1)), and local minima of V1 are calculated. FIG. 4 is a plot of V1 values as a function of position in a pixelated image, showing minima (labeled "a" in FIG. 4), which correspond to the vertical boundaries 304 in FIG. 3. An analogous vector V2 and its local minima are then calculated using the transpose of the sub-image (SUBIM(k, 1)) to determine the horizontal boundaries 302 in the sub-image. For each crossing point (e.g., u,v in FIG. 3), a sub-matrix starting at (u,v) with size (Δi,ΔD) is defined and the total power (i.e., the sum of all grey levels) contained in that sub-matrix is calculated and the result is stored a vector W1. The vector W1 is then normalized to its mean value (i.e., W1=W1/mean(W1)).

The division of the image into sub-images, calculation of V1 and V2 and local minima thereof, definition of sub-matrices and calculation of total energies of sub-matrices, and normalization of vector W1 are performed for all possible sub-images (SUBIM(k,1)). All W1 vectors are then transferred into a single vector W2, which contains all of the integrated images for all of the sub-images. The standard deviation of W2, which is defined as the PPD of the starting image—and thus quantifies the amount of sparkle associated with the starting image—is then calculated.

In some embodiments, background may be subtracted out of the sparkle measurements by acquiring a background image (IM_background) when the image source 100 is completely dark and calculating the value of (IM0—IM_background). In other embodiments, the background can be determined by calculating a vector equal to the average of k lines and determine the minimum value over that vector. In some embodiments, abnormal points in the P(i,j) distribution where the departure from the mean value of W2 exceeds a predetermined value (e.g., four time the standard deviation) may be eliminated. In other embodiments, the maximum power per sub-matrix may be measured in parallel to measuring the integrated power over the sub-matrices. In still other embodiments, a metric other than the standard deviation may be used to determine sparkle/PPD. For example, limits of 5% above (high) and below (low) of the histogram may be selected. In one example, having a 5% low equal to 0.92 means that 5% of the pixels have a peak power that is lower than 0.92 times the average value peak power value. Similarly, having a 5% high equal to 1.09 means that 5% of the pixels have a peak power that is higher than 1.09 times the average value.

The algorithm described hereinabove allows the amount of sparkle present in a given image to be quantified. When there is no transparent sample 140 in the optical path 105, the resulting numerical sparkle/PPD value is the one that corresponds to the pixelated source 140. When a transparent sample 140 is inserted, the resulting numerical value is the combination of the sparkle of the transparent sample 140 and the sparkle that is inherent in the pixelated source 110 that is used in the apparatus 100. In some embodiments, the sparkle contribution of the pixelated source 100 may be removed or subtracted out so as to determine only the sparkle contribution of the transparent sample 140. To achieve this goal, a first image without the sample (IM0_ref) and a second image with the sample (IM0) are generated. Both images are then processed as described hereinabove and different vectors W1_ref and W1 are calculated for each sub-image SUBIM. Instead of normalizing W1 with respect to the mean value of W1 as previously described hereinabove, however, the vector W1 for each element k (W1(k)) is normalized with respect to W1_ref:

$$W1(k)=W1(k)/W1\_ref(k).$$

For the above approach to be valid, the power per pixel is calculated over exactly the same window for the reference and the transparent sample. In addition, it is preferred that the coordinates of the center of each pixel and the pixel pitch (Δn,Δm) used for the power calculation in each image should be the same. This is accomplished by ensuring that the pixilated source 100 does not move during the acquisition of both images. Alternatively, inserting reference features such as isolated lines and columns of pixels into the pixilated image may be used as fiducials to reference the position of one image with respect to the other image.

Figure 5:
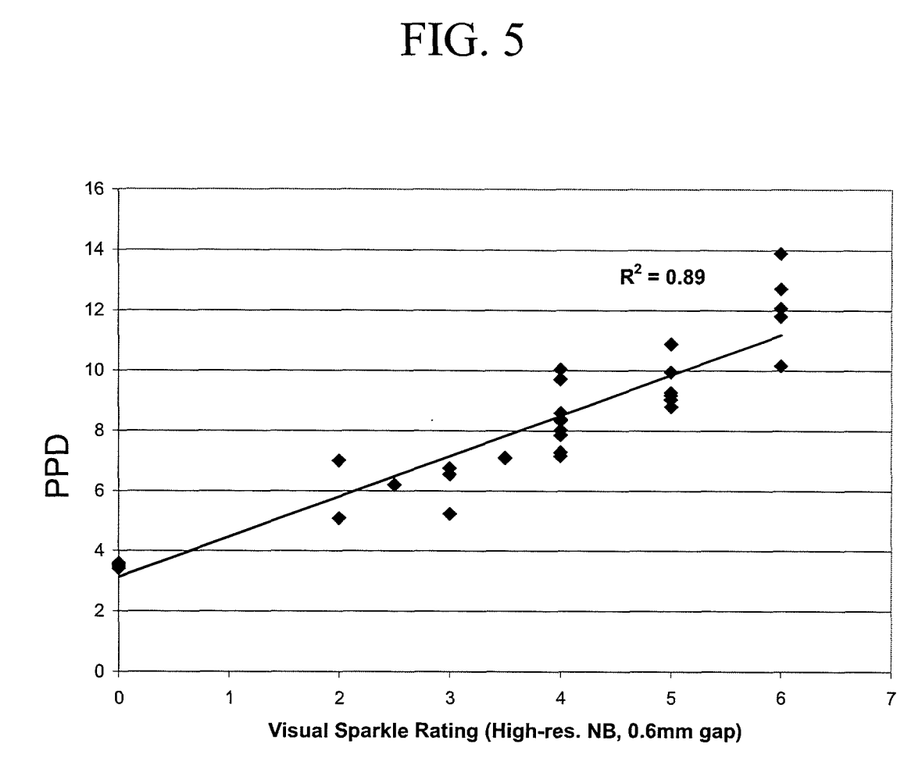
FIG. 5 is a plot of pixel power deviation (PPD) as a function of the visual sparkle rating.

To ensure that the PPD number derived for an image from the method and algorithms described hereinabove correlates with human perception, PPD numbers are calibrated against the degree of sparkle that is visible in the image. To determine the degree of correlation, the amount of sparkle in an image is visually estimated and the perceived degree of sparkle is indexed against a scale using reference samples. Such a correlation is shown in FIG. 5, which is a plot of PPD, determined using the unreferenced algorithm described hereinabove, as a function of the visual sparkle rating for a display under predetermined viewing conditions. In the plot shown in FIG. 5, a visual sparkle rating of 0 is assigned to transparent samples that have no antiglare (AG) texture or roughness. A "threshold" visual sparkle rating of 2 is assigned those samples in which sparkle is just barely visible. Visual sparkle ratings of greater than 2 are assigned when sparkle is observed, with increasing values corresponding to greater observed sparkle. As seen in FIG. 5, the PPD values that were obtained using the unreferenced algorithm described hereinabove correlate well with visual observation. FIG. 5 also indicates that the point at which sparkle is just barely noticeable to a human observer (threshold visual sparkle rating=2) when PPD for an image is in a range from about 6% to about 7%. The particular threshold for viewer sensitivity will depend on items, such as the background noise level, which are not referenced out of the data in FIG. 5. It should be noted that the choice of total integrated power per pixel as the basis for the PPD calculation was based on good correlation to human visual observations—it was not obvious at the outset of this work that this metric would correlate well to human observations. For example, it has also been found that choosing the maximum peak intensity per pixel as the basis for the PPD calculation does not yield good correlations to human visual judgment of sparkle.

Figure 6:
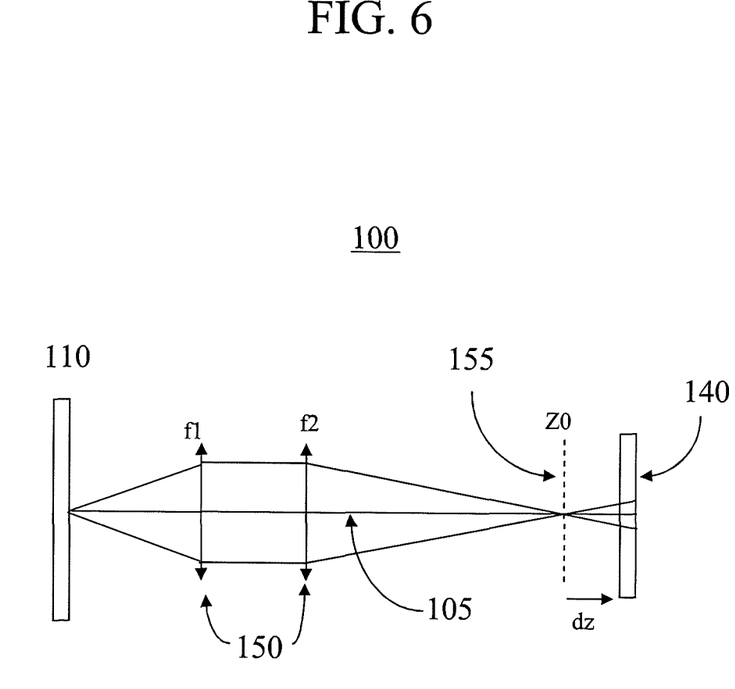
FIG. 6 is a schematic representation of the apparatus of FIG. 1 in which at least one lens is disposed between the pixelated source and transparent sample.

PPD may be determined as a function of parameters—such as pixel size, distance from the antiglare surface to the emitting pixels of pixelated source 110, or the like—which can affect the amplitude of sparkle. Accordingly, the apparatus 100 in some embodiments may further include at least one lens, as schematically shown in FIG. 6. The at least one lens 150 is disposed in the optical path 105 between the pixelated source 110 and the transparent sample 140 and forms an image 155 of the pixels in the pixelated source 100 at a point Z0 between the transparent sample 140 and the at least one lens 150 along the optical path 105. The transparent sample 140 may be placed at any arbitrary distance dz from the image of the pixelated source 155. Also, the size of the image 155 of the pixels may be modified by changing the focal length (using, for example, a camera zoom lens) of the at least one lens.

Sparkle is dependent on the image that is transmitted through the antiglare surface of a transparent sample. If the image were completely uniform and un-pixelated, no sparkle would be observed. In some embodiments, multiple test images in which the pixelated information is varied from image to image may be used to determine sparkle/PPD. Such pixilated information may include pixel orientation (e.g., the orientation of an elongated pixel axis with respect to the antiglare surface), pixel color (to measure and chromatic dependence of sparkle), and pixel "pattern (the fraction of pixels that are in the ON mode). For example, an image with all pixels on may give a different PPD value than an image in which only every other pixel is on), or the like. In some embodiments of the PPD measurement method and apparatus described herein, only one color (e.g., only green pixels) of pixels is illuminated so that the intensity variations between red, green, and blue pixels can be ignored. Alternatively, if all pixels are illuminated, then the different positions and respective average intensities for red, green, and blue pixels can be calculated and used as the normalizing factor for each respective pixel color.

When the position of an observer with respect to a pixelated image is moved, the perception of sparkle is altered. Accordingly, the apparatus 100, as previously described hereinabove, is capable of measuring angular sensitivity of sparkle by providing an image system 120 that is movable about the pixelated source 110. In addition, the position of the transparent sample 140 relative to the image system 120 and/or the pixelated source 100 may be altered to measure angular sensitivity.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. An apparatus for measuring pixel power deviation of a transparent sample, the apparatus comprising:
   a pixelated source, the pixelated source comprising a plurality of pixels, wherein each of the plurality of pixels has referenced indices i and j; and
   an imaging system optically disposed along an optical path originating from the pixelated source, the imaging system comprising:
      an imaging device receiving an image from the pixelated source through the transparent sample, the imaging device being disposed along the optical path; and
      an aperture disposed on the optical path between the pixelated source and the imaging device, wherein the aperture has an adjustable collection angle for an image originating from the pixelated source,
   wherein the imaging system determines boundaries between adjacent pixels of the plurality of pixels in the image, integrates within the boundaries to obtain an integrated total power for each of the plurality of source pixels in the image, and calculates the pixel power deviation of the transparent sample based on the integrated total powers.

2. The apparatus of claim 1, wherein the transparent sample is disposed in the optical path between the pixelated source and the aperture.

3. The apparatus of claim 2, further comprising at least one lens disposed in the optical path between the pixelated source and the transparent sample, and wherein the at least one lens forms an image of the pixelated source between the transparent sample and the at least one lens along the optical path.

4. The apparatus of claim 3, wherein the transparent sample is separated from the image of the pixelated source by a distance dz.

5. The apparatus of claim 2, wherein the transparent sample comprises a glass.

6. The apparatus of claim 5, wherein the glass is one of an alkali aluminosilicate glass and an alkali aluminoborosilicate glass.

7. The apparatus of claim 1, wherein the imaging device comprises a film camera.

8. The apparatus of claim 1, wherein the pixelated source is one of a LCD display, an OLED display, a DLP projector, and a LCOS projector.

9. The apparatus of claim 1, wherein the imaging device comprises a pixelated sensitive area comprising a second plurality of pixels, wherein each of the second plurality of pixels is referenced with indices m and n.

10. The apparatus of claim 9, wherein the plurality of pixels in the pixelated source forms a source image and the second plurality of pixels forms a second image, and wherein the source image is greater in spatial extent than the second image.

11. A method of determining pixel power deviation for a transparent sample, the method comprising:
acquiring, by an image device of an image display system, an image of the transparent sample combined with a pixelated source, the image comprising a plurality of source pixels;
determining, by the image display system, boundaries between adjacent source pixels in the image;
integrating, by the image display system, within the boundaries to obtain an integrated total power for each of the plurality of source pixels in the image; and
calculating, by the image display system, a dispersion of the integrated total power for each of the plurality of source pixels, wherein the dispersion is the pixel power deviation.

12. The method of claim 11, wherein the dispersion is a standard deviation of the power per source pixel normalized to an average power per source pixel.

13. The method of claim 11, wherein the step of acquiring an image of the transparent sample combined with the pixelated source comprises:
disposing the transparent sample in an optical path between a pixelated source and an imaging system;
transmitting an image from the pixelated source through the transparent sample;
receiving the image in the imaging system, wherein the imaging system generates a second image, the second image corresponding to the image transmitted through the transparent sample.

14. The method of claim 13, wherein the imaging system comprises a film camera.

15. The method of claim 13, wherein the imaging system comprises a pixelated sensitive area comprising a second plurality of pixels.

16. The method of claim 11, wherein the step of determining boundaries between adjacent pixels comprises:
determining a pitch of each pixel in the image of the pixelated source; and
determining a center position (i,j) for each pixel in the image of the pixelated source.

17. The method of claim 11, wherein the step of integrating within the boundaries to obtain the integrated total power for each of the plurality of source pixels comprises:
integrating power over a window centered on a source pixel center position with a window size corresponding to a source pixel pitch; and
calculating an integrated power per source pixel from the integrated power.

18. The method of claim 11, further comprising correlating the pixel power deviation with a visual impression of sparkle.

19. The method of claim 18, wherein correlating the pixel power deviation with the visual impression of sparkle comprises:
visually observing the pixelated image;
estimating the degree of sparkle; and
assigning a visual sparkle rating to the degree of sparkle.

20. The method of claim 11, wherein the pixelated source is one of a LCD display, an OLED display, a DLP projector, and a LCOS projector.

21. The method of claim 11, further comprising:
acquiring a first image of the pixelated source alone, the first image comprising a plurality of source pixels;
determining boundaries between adjacent source pixels in the first image;
integrating within the boundaries to obtain an integrated total power for each source pixel in the first image; and
calculating a dispersion of the integrated power per source pixel, wherein the standard deviation is the pixel power deviation of the first image.

22. The method of claim 21, further comprising obtaining the pixel power deviation of the transparent sample by subtracting the pixel power deviation of the first image from the pixel power deviation of the image of the transparent sample combined with the pixelated source.

23. The method of claim 11, wherein determining boundaries between adjacent source pixels in the image comprises:
determining a pixel pitch of the source pixels;
calculating a Fourier transform of the image;
identifying peaks in the Fourier transform associated with the pixel pitch and the pixel pitch in both horizontal and vertical directions; and
dividing the image into a plurality of sub-images, each of the plurality of sub-images containing a predetermined number of source pixels.

24. The method of claim 23, wherein the step of integrating within the boundaries to obtain an integrated total power for each source pixel in the image comprises:
calculating a vector V1 and local minima of V1, wherein V1 is equal to the sum of all lines in each of the plurality of sub-images;
defining a plurality of sub-matrices;
calculating a total energy power contained in each of the plurality of sub-matrices;
wherein the total energy power for each of the plurality of sub-matrices is stored a vector W1;
normalizing the vector W1 to a mean value for the plurality of sub-images; and
transferring the vector W1 into a single vector W2, wherein the vector W2 contains all integrated images for all of the sub-images.

* * * * *